Patented Sept. 4, 1945

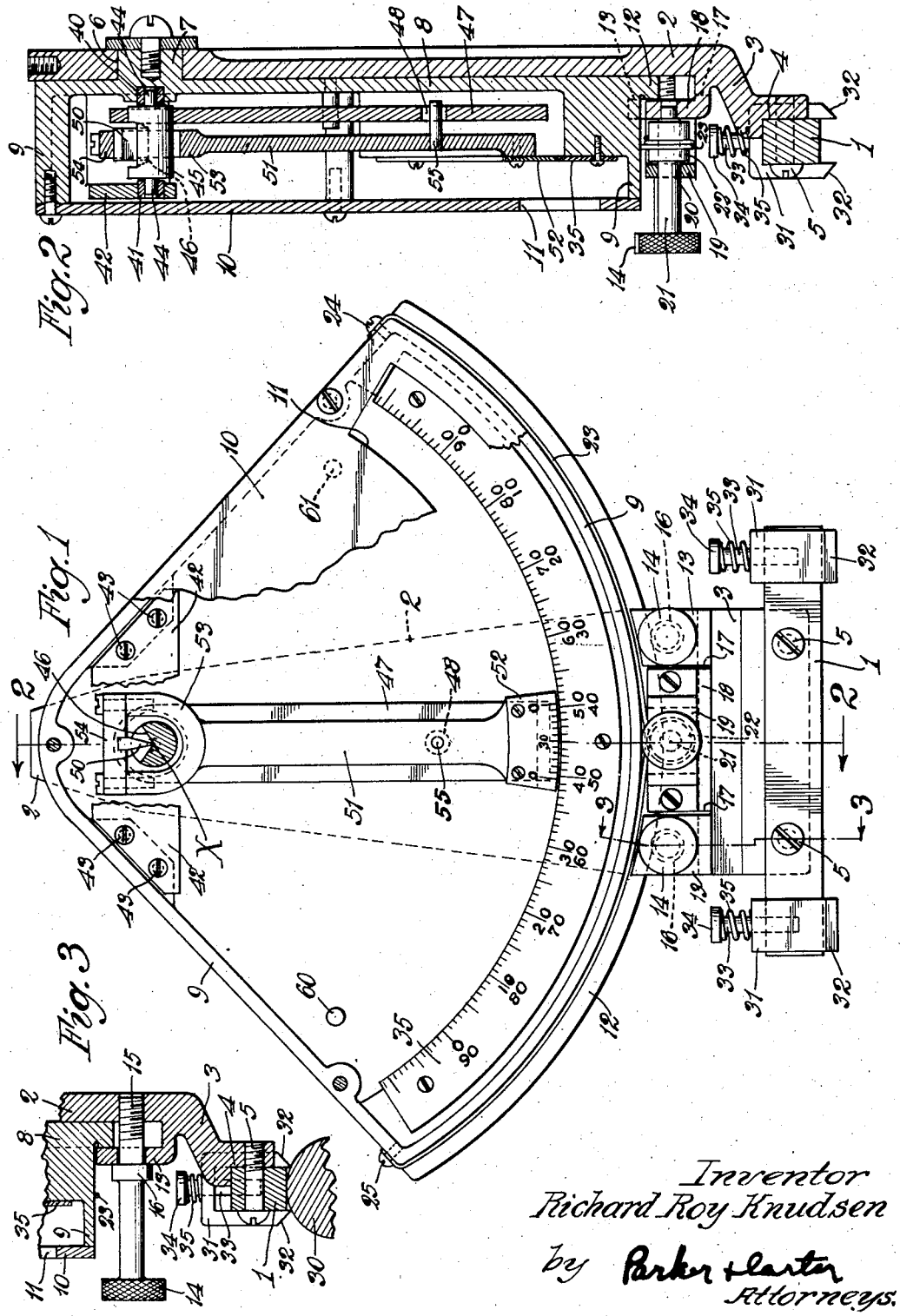

2,384,100

UNITED STATES PATENT OFFICE 2,384,100

PROTRACTOR

Richard Roy Knudsen, Chicago, Ill.

Application March 27, 1943, Serial No. 480,744

6 Claims. (Cl. 33—219)

My invention relates to an improvement in protractors and has for one object to provide an improved pendulum protractor. Another object is the provision of a protractor or angle indicator which is adapted, for example, to indicate the deflection of an angle from a given norm.

Another object is the provision of a protractor which may be easily applicable to gauging surfaces, whether the surfaces are generally horizontal or generally vertical or depart from both horizontal and vertical.

Other objects will appear from time to time throughout the specification and claims.

My invention is illustrated more or less diagrammatically in the accompanying drawing, wherein—

Figure 1 is a front elevation with parts broken away;

Figure 2 is a section along the line 2—2 of Figure 1;

Figure 3 is a section along the line 3—3 of Figure 1.

Like parts are indicated by like characters throughout the specification and drawing.

Referring to the drawing, 1 indicates a base bar herein shown as angular in cross section. Secured to the bar and upwardly extending from it is a frame generally indicated as 2. It includes a bottom elbow portion 3, which as shown in Figures 2 and 3 terminates in an angular recessed portion 4, adapted to engage parts of two sides of the bar 1. 5 indicates any suitable securing means, screws or the like for holding the members 1 and 2 together. The upwardly extending member 2 is provided adjacent an upper portion with an aperture 6. This aperture serves as a bearing for a stud 7 rearwardly extending from the rear housing plate 8. The housing plate is provided with a forwardly extending side wall 9 extending forward from its entire circumference. The housing is completed by any suitable cover plate 10 which is provided with a circular slot 11. The slot member, if desired, may be closed by glass, plastic, or any suitable transparent material. As will be clear from Figure 1, the contour of the lower portion of the housing thus formed is arcuate, the arc being described about the center X. A downwardly extending flange 12 extends into the space between the member 2 and the forwardly spaced upwardly extending flange 13 herein shown as unitary with the member 2.

It will be understood that the housing is rotatable about the center of the aperture 6, that center being defined by the point X as shown in Figure 1. In order to lock the housing in position, I provide for example, two thumb nuts 14 which are screw threaded as at 15 to the member 2 and which have abutments 16 adapted to be urged against the flange 13 in order to flex them into locking relationship with the flange 12. It will be observed that there are two of the flanges 13, one for each of the thumb screws 14. These flanges are separated by slots 17 from an intermediate flange 18, which lies in the same general plane as the flanges 13 and is like them, secured to or integral with the member 2. This intermediate flange 18 carries a forwardly spaced support or bracket 19 which is apertured as at 20 to receive the thumb controlled rotary pin 21, having a drum 22 to which is anchored a wire or cable 23, the opposite ends of which are anchored as at 24 and 25 to the housing formed by the members 8, 9 and 10. It will be understood that when the thumb screws 14 are released, rotation of the thumb controlled pin 21 permits movement of the housing about the center X to any desired setting.

In order to aid in gauging round stock, I provide end members at each end of the bar 1, each such end member is in the form of a U 31, with inwardly beveled edges 32 and a guiding pin 33 fixed in the bar 1. It will be understood that each of the U's slides in the pin 33. Each such pin is headed as at 34 and a spring 35 normally urges the U-shaped members to the position in which they are shown in Figures 1 and 2. When the work is gauged the U-shaped members may be thrust into the position shown for example in Figure 3. They do not prevent gauging flat members but they are of assistance in gauging round members as indicated by numeral 30 in Figure 3. Positioned within the housing and in alignment with the slot 11 is an arcuate calibrated member 35 shown as graduated to ninety degrees and calibrated to be read on either end.

Concentric with the stud 7 and inset in the face of the member 8 is a jewel bearing 40. A corresponding jewel bearing 41 is supported in any suitable supporting bridge or bracket or plate 42 which may be secured as at 43 to the rear member or plate 8.

Mounted in the jewel bearings by penetrating trunnions 44 is the pivot member 45 shown as generally cylindrical but as partly cut away on its upper edge as at 46. The cut away portion terminating in an angle located precisely at the center X. The member 45 also carries a pendulum weight 47 which is shown as apertured as at 48. Supported in the angle 46 by a knife edge 50 is the indicating pendulum 51 which carries a vernier scale 52, the edge of which closely approaches and is preferably concentric with the upper edge of the scale 35. The pendulum member may include a fork 53 closed by an upper member 54 to which the knife edge member 50 is actually secured. It may for example be inset therein. In order to limit the pendulum in relation to the weight 47, I provide a rearwardly extending pin 55 which penetrates the aperture 48 in the weight. It will be observed that the aperture is of substantially greater diameter than the pin. 60 and 61 are abutments which limit the movement of the weight and pendulum in relation to the housing.

The use and operation of my invention are as follows:

In gauging a surface, the bar 1 is applied to the surface. The thumb screws 14 are released. The thumb control pin 21 is then rotated to move the housing about the center X until one of the zeros of the vernier is aligned precisely with the zero of the scale on the member 52. The housing is then locked in that position and deflections from the subsequently gauged members are read by a relative deflection of the scales 35 and 52.

I claim:

1. In a pendulum protractor, a base element adapted to be opposed to a surface to be gauged, a support on said base element, an arcuate scale member rotatably adjustable on said support about a center remote from said base element, means for adjusting said scale in relation to said support, means for locking it in adjusted position, and a pendulum mounted for rotation about an axis concentric with the axis of rotation of said scale, said pendulum having at its lower end an indicating scale positioned closely adjacent said scale, and a weight mounted for limited independent movement co-axially with the pendulum, and a connection between said weight and pendulum adapted to prevent substantial relative movement.

2. In a pendulum protractor, a base element adapted to be opposed to a surface to be gauged, a support on said base element, an arcuate scale member rotatably adjustable on said support about a center remote from said base element, means for adjusting said scale in relation to said support including a manually rotatable member and a flexible cable secured thereto intermediate the ends of the cable, the opposed ends of the cable being secured to opposed ends of the scale, means for locking the scale in adjusted position, and a pendulum mounted for rotation about an axis concentric with the axis of rotation of said scale, said pendulum having an indicating element positioned closely adjacent the scale.

3. In a pendulum protractor, a base element adapted to be opposed to a surface to be gauged, a support extending from said base element, a pendulum housing mounted on said support for rotary adjustment about a center substantially removed from the base element and from the work contacted thereby, a pendulum in said pendulum housing, rotatable therein about an axis generally concentric with the axis of the pendulum housing, an arcuate scale mounted for movement with said pendulum housing and a scale at the lower end of said pendulum, opposed thereto, and a weight in said housing mounted for rotation generally concentrically with the pendulum.

4. In a pendulum protractor, a base element adapted to be opposed to a surface to be gauged, a support extending from said base element, a pendulum housing mounted on said support for rotary adjustment about a center substantially removed from the base element and from the work contacted thereby, a pendulum in said pendulum housing, rotatable therein about an axis generally concentric with the axis of the pendulum housing, an arcuate scale mounted for movement with said pendulum housing and a scale on the lower end of said pendulum, opposed thereto, and a weight in said housing mounted for rotation generally concentrically with the pendulum, and means for limiting relative movement of pendulum and weight.

5. In a pendulum protractor, a base element, a support extending upwardly from said base element, a segment shaped housing rotatable on said support about a center remote from said support, an arcuate calibrated scale mounted on and movable with said housing about said center, a pendulum mounted for free rotation, in relation to said base and housing, and housed within the housing, about a center concentric with the center of rotation of the housing, a calibrated portion on said pendulum opposed to and movable in relation to the arcuate calibration of the housing.

6. In a pendulum protractor, a base element, a support extending upwardly from said base element, a segment shaped housing rotatable on said support about a center remote from said support, an arcuate calibrated scale mounted on and movable with said housing about said center, a pendulum mounted for free rotation, in relation to said base and housing, and housed within the housing, about a center concentric with the center of rotation of the housing, a calibrated portion on said pendulum opposed to and movable in relation to the arcuate calibration of the housing, and an additional weight mounted about the same center as the pendulum, and means for permitting slight relative movement of the pendulum and weight.

RICHARD ROY KNUDSEN.